United States Patent
Roantree et al.

(10) Patent No.: US 8,693,062 B2
(45) Date of Patent: Apr. 8, 2014

(54) FACSIMILE SERVICE SUPPORT DEVICE, SYSTEM, AND METHOD

(75) Inventors: Martin Roantree, Herts (GB); Joanna Keep, Hertfordshire (GB); Sahadevasangary Gajedevasangary, Hertfordshire (GB); Maysara Fermawi, Hertfordshire (GB)

(73) Assignee: Xerox Corporation, Norwalk, CT (US)

( * ) Notice: Subject to any disclaimer, the term of this patent is extended or adjusted under 35 U.S.C. 154(b) by 432 days.

(21) Appl. No.: 13/023,638

(22) Filed: Feb. 9, 2011

(65) Prior Publication Data
US 2012/0200898 A1 Aug. 9, 2012

(51) Int. Cl.
*H04N 1/00* (2006.01)
(52) U.S. Cl.
USPC .......... 358/406; 358/1.15; 358/400; 358/402; 358/404; 358/436; 370/352
(58) Field of Classification Search
USPC ........ 358/1.15, 400, 402, 404, 406, 436, 437; 370/352
See application file for complete search history.

(56) References Cited

U.S. PATENT DOCUMENTS

| | | | |
|---|---|---|---|
| 4,965,676 A | 10/1990 | Ejiri et al. | |
| 5,822,084 A | 10/1998 | Hwang | |
| 6,032,004 A | 2/2000 | Mirabella, Jr. et al. | |
| 6,101,243 A | 8/2000 | Kim | |
| 6,697,172 B2 | 2/2004 | Hirokawa | |
| 7,668,912 B2 * | 2/2010 | Nelson et al. | 709/204 |
| 2003/0227653 A1 * | 12/2003 | Jeong | 358/437 |
| 2007/0036276 A1 * | 2/2007 | Tanimoto | 379/1.01 |
| 2007/0153329 A1 * | 7/2007 | Sugawara et al. | 358/1.15 |

FOREIGN PATENT DOCUMENTS

| | | |
|---|---|---|
| DE | 4017298 | 12/1990 |
| JP | 11205505 | 7/1999 |
| KR | 100226223 | 10/1999 |
| KR | 20040054932 | 6/2004 |

* cited by examiner

*Primary Examiner* — Allen H Nguyen
(74) *Attorney, Agent, or Firm* — Gibb & Riley, LLC

(57) ABSTRACT

An exemplary method herein operates to help diagnose and correct facsimile transmission errors. The method detects a first facsimile transmission error using an arbitrarily named "first" facsimile machine (which can be a sending facsimile machine or a receiving facsimile machine). The facsimile transmission error occurs during a first facsimile transmission sent from the sending facsimile machine to the receiving facsimile machine. Upon detecting the first facsimile transmission error, the sending facsimile machine automatically contacts a service center computer. The service center computer automatically connects the sending facsimile machine to the receiving facsimile machine through the service center computer. Then, the sending facsimile machine sends a test facsimile transmission to the receiving facsimile machine through the service center computer. The method automatically records sounds sent by the sending facsimile machine and the receiving facsimile machine using the service center computer to produce an audio diagnostic file and automatically forwards the audio diagnostic file to a service engineer for diagnosis.

19 Claims, 4 Drawing Sheets

FACSIMILE SERVICE SUPPORT DEVICE, SYSTEM, AND METHOD

BACKGROUND

Embodiments herein generally relate to curing problems with facsimile transmissions and more particularly to devices, systems, and methods that automatically send a failed facsimile transmission to a service center to perform a diagnostic routine.

Generally, facsimile (fax) machines scan a physical item (such as a sheet of paper) to produce a stream of data, which the facsimile machines then transmit (often over standard telephone lines) to other facsimile machines using a number of different standardized data transmission protocols. However, there are many areas where such facsimile transmissions can fail.

Interoperability or network problems between facsimile (fax) machines are difficult for field engineers to fix. They usually result in at least one, if not several visits from engineers, which increases service costs and customer dissatisfaction, and can take an unacceptable time to resolve.

SUMMARY

An exemplary method herein operates to help diagnose and correct facsimile transmission errors. The method detects a first facsimile transmission error using an arbitrarily named "first" facsimile machine (which can be a sending facsimile machine or a receiving facsimile machine). The facsimile transmission error occurs during a first facsimile transmission sent from the sending facsimile machine to the receiving facsimile machine.

Upon detecting the first facsimile transmission error, the method can provide an option to perform a diagnostic routine on the first facsimile transmission through a graphic user interface of the first facsimile machine. Upon selection of the option to perform the diagnostic routine, the first facsimile machine automatically contacts a service center computer. This occurs when the first facsimile machine is the sender. If the first facsimile machine is the receiver, and the sender does not have the features of embodiments herein, the sender calls the service center with a manual call.

The service center computer automatically connects the sending facsimile machine to the receiving facsimile machine. Then, the sending facsimile machine sends a test facsimile transmission to the receiving facsimile machine through the service center computer and the service center computer records sounds sent by the sending facsimile machine and the receiving facsimile machine during the test facsimile transmission to produce an audio diagnostic file. The method tags the audio diagnostic file with a job number, and date and time stamps the audio diagnostic file using the service center computer. Then, the method automatically forwards the audio diagnostic file to a service engineer for diagnosis, using the service center computer.

Additionally, the method can automatically send an e-mail to the user who is associated with the sending facsimile machine from the service center computer. The e-mail identifies the diagnostic routine. After the service engineer has diagnosed the facsimile transmission problem, the method sends an e-mail with a problem solution suggestion from the service engineer to a user associated with the sending facsimile machine based on the diagnosis of the audio diagnostic file.

An exemplary system embodiment herein again includes the first facsimile machine (which again can be a sending facsimile machine or a receiving facsimile machine) that detects a first facsimile transmission error. The facsimile transmission error again occurs during a first facsimile transmission sent from the sending facsimile machine to the receiving facsimile machine.

Further, the system includes a service center computer that is operatively connected to the first facsimile machine. Upon detection of the first facsimile transmission error, a graphic user interface of the first facsimile machine can provide an option to perform a diagnostic routine on the first facsimile transmission. Additionally, upon selection of the option to perform the diagnostic routine, the sending facsimile machine automatically contacts the service center computer. If the first facsimile machine is the receiver, and the sender does not have the features of embodiments herein, the sender calls the service center with a manual call. The service center computer automatically connects the sending facsimile machine to the receiving facsimile machine.

The sending facsimile machine then automatically sends the receiving facsimile machine a test facsimile transmission through the service center computer. The service center computer automatically records sounds sent by the sending facsimile machine and the receiving facsimile machine during the test facsimile transmission to produce an audio diagnostic file. The service center computer tags the audio diagnostic file with a job number, and date and time stamps the audio diagnostic file.

Then, the service center computer automatically forwards the audio diagnostic file to a service engineer for diagnosis. The service center computer can also send an e-mail to the user associated with the sending facsimile machine. The e-mail identifies the diagnostic routine. The service engineer sends an e-mail with a problem solution suggestion to a user associated with the sending facsimile machine based on the diagnosis of the audio diagnostic file.

Additional exemplary embodiments herein include a facsimile machine embodiment. This particular facsimile machine includes a scanner that scans an image of an item. A processor is operatively connected to the scanner and processes the image of the item. Also, an input/output communications port is operatively connected to the processor. The input/output sends the image of the item to other devices external to the facsimile machine as facsimile transmissions. Further, a graphic user interface can be operatively connected to the processor and allows a user to provide input and receive notifications.

The processor detects a first facsimile transmission error. Again, the first facsimile transmission error occurs during a first facsimile transmission sent from the input/output communications port to a receiving facsimile machine. Upon the detection of the first facsimile transmission error, the graphic user interface can provide an option to perform a diagnostic routine on the first facsimile transmission. The graphic user interface can also or alternatively provide an audible alarm upon detecting the facsimile transmission error. The graphic user interface can further provide an input field for a number of the service center computer. Additionally, the graphic user interface can provide an input question for a user to allow recordation of facsimile transmissions.

Following this, upon selection of the option to perform the diagnostic routine, the input/output communications port automatically contacts the service center computer for diagnostic analysis. Then, the service center computer connects the input/output communications port to the receiving facsimile machine through the service center computer.

Next, the input/output communications port sends a test facsimile transmission to the receiving facsimile machine through the service center computer. The service center computer automatically records sounds sent by the sending facsimile machine and the receiving facsimile machine during the test facsimile transmission to produce an audio diagnostic file. Additionally, the service center computer automatically forwards the audio diagnostic file to a service engineer for diagnosis.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, facsimile transmission failures increase service costs and customer dissatisfaction, and can take an unacceptable time to resolve. The embodiments herein address this issue by providing a fax service support tool that reduces service costs and improves fax problem resolution times. The tool provided herein automatically produces an audio diagnostic file (e.g., a .wav file) of the fax communication, allowing analysis and problem fixes to be developed by remote fax specialists.

For example, with embodiments herein if a customer experiences problems sending a fax to another fax machine, instead of the normal fax job abort procedure, an alarm can be enabled and a pop-up screen can appear on the facsimile's graphic user interface inviting the customer to use the tools described herein (sometimes referred to as a "Fax Assist Feature"). If selected, the sending fax would automatically dial the "problem" remote fax via the diagnostic tool and send an embedded test page to the remote fax. This fax communication would be recorded by the tool, thus enabling the fax analysis and potential NVM fixes to be applied to the sending fax.

Figure 1:
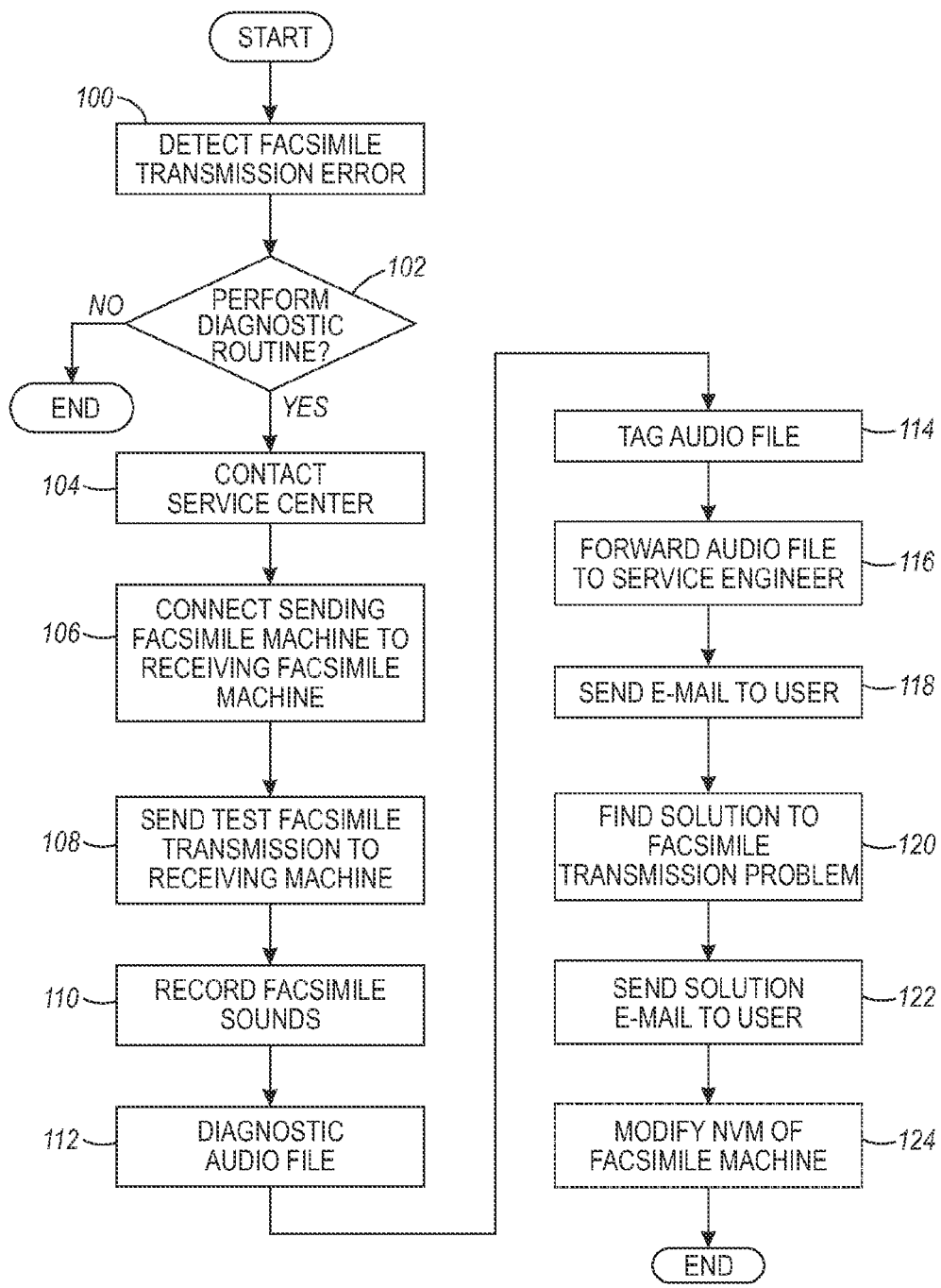
FIG. 1 is a flow diagram illustrating various embodiments herein.

More specifically, as illustrated in flowchart form in FIG. 1, one exemplary method herein operates to help diagnose and correct facsimile transmission errors. In item 100, this exemplary method detects a first facsimile transmission error using an arbitrarily named "first" facsimile machine (which can be a sending facsimile machine or a receiving facsimile machine). The facsimile transmission error occurs during a first facsimile transmission sent from the sending facsimile machine to the receiving facsimile machine.

Upon detecting the first facsimile transmission error, the method can optionally provide (through the graphic user interface of the first facsimile machine) a user-selectable option to perform a diagnostic routine on the first facsimile transmission (item 102).

For example, the graphic user interface could request that the user enter the telephone number of the local service center (or Welcome Centre) where the tool is located, and enter the remote fax number, or these numbers could be automatically supplied from the information stored in the facsimile's temporary or long-term memory. By using pre-defined telephone numbers (setup as part of the install wizard) and recently dialed numbers from temporary memory, the embodiments herein ensure that the correctly configured dialing string is sent to the tool by untrained users.

Thus, when a problem exists with sending a fax, a dial string such 1234,,,,,,,,,5678 would be supplied. In this example, 1234 is the telephone number of the fax service support tool in the Welcome Centre and 5678 is the destination of the remote fax. The ",,," could be pause characters allowing the first number to be dialed and answered before sending the routing number of the remote fax. A receiving call is managed in the same way.

For legal reasons, the customer could also be requested to tick a box to agree that both the local and remote fax transmission can be recorded for the purposes of problem resolution. The fax service support tool of embodiments herein can also have relevant security and authentication layers to prevent misuse by hackers etc.

If the user selects the option to perform the diagnostic routine, the first facsimile machine automatically contacts (e.g., by telephone line, voip line, network connection, etc.) a service center computer in item 104. For embodiments that do not include the optional processing in item 102, the diagnostic routine in item 104 is always automatically performed (and the first facsimile machine always contacts the service center computer whenever a facsimile transmission error occurs). If the first facsimile machine is the receiver, and the sender does not have the features described herein, the sender calls the service center with a manual call.

In item 106, the service center computer automatically connects the sending facsimile machine to the receiving facsimile machine through the service center computer (e.g., by telephone line, voip line, network connection, etc.). Then, in item 108, the sending facsimile machine sends a test facsimile transmission (potentially containing part of or all of the first facsimile transmission) to the receiving facsimile machine through the service center computer.

In item 110, the method automatically records sounds produced by the sending facsimile machine and the receiving facsimile machine during the test facsimile transmission (using the service center computer) to produce an audio diagnostic file (shown as item 112). The method tags the audio diagnostic file with a job number, and date and time stamps the audio diagnostic file using the service center computer in item 114. Then, the method automatically forwards the audio diagnostic file to a service engineer for diagnosis, using the service center computer, in item 116.

Additionally, the method can automatically send an e-mail to the user who is associated with the sending facsimile machine from the service center computer in item 118. The e-mail identifies the diagnostic routine and lets the user know that the problem is being addressed.

To assist the service engineer, the audio diagnostic file can be filtered to remove unnecessary noise and be automatically analyzed (using a fax analyzer) to provide, for example, signal timing information and other post-processing results. After the service engineer has diagnosed the facsimile transmission problem and found the solution in item 120, the method automatically sends an e-mail with a problem solution suggestion from the service engineer to a user associated with the sending or receiving facsimile machine based on the diagnosis of the audio diagnostic file in item 122.

Next, the service engineer can remotely (or through a service call) make changes to the non-volatile memory NVM of the user's facsimile machine to prevent the same transmission error from occurring in the future in item 124. Thus, if the facsimile machine has network connectivity, the NVM change can be made through the network. Alternatively, the NVM update can be made to the user, who can perform the update through a local computer. Further, this NVM change can be for all future facsimile transmissions and receipts or can be for selected facsimile transmissions and receipts. For example, the NVM changes can be made effective for a limited set of potential senders/recipients, such as those from a certain country code, area code, etc., or those using a certain brand of class of facsimile machine.

Figure 2:
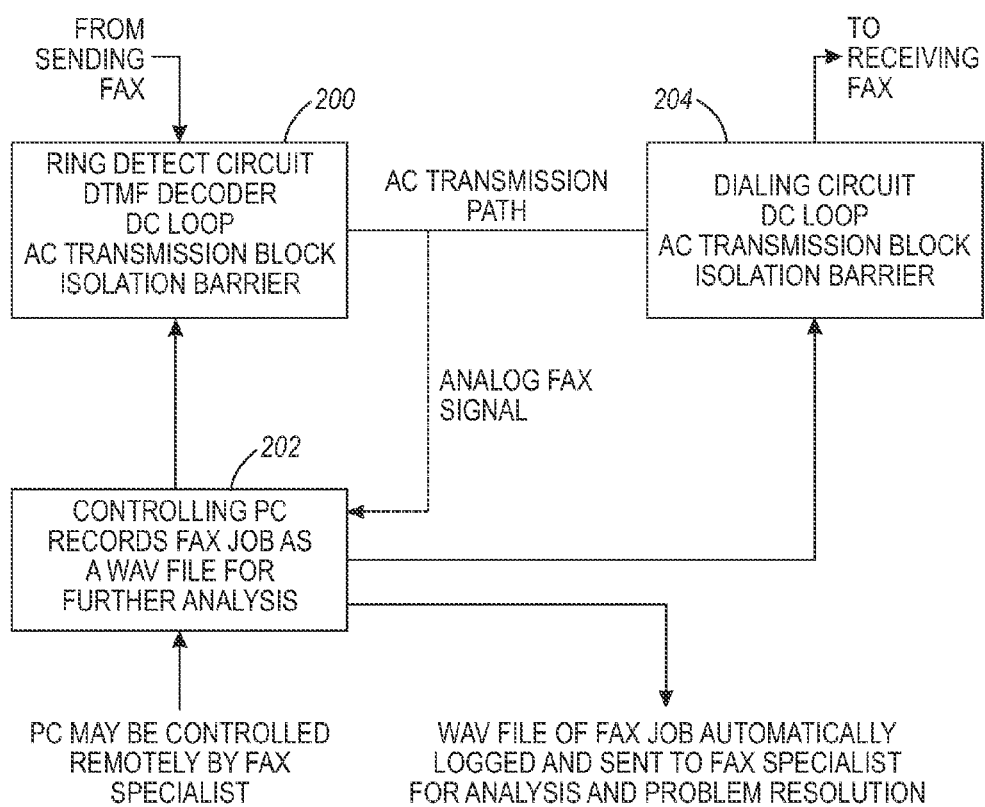
FIG. 2 is a block diagram illustrating various embodiments herein.

Referring to FIG. 2, a block diagram illustrates some of the foregoing operations using the example of sending a facsimile transmission. The string 1234,,,,,,,,,,5678 may be automatically supplied to identify the service center and the called fax number. More specifically, the telephone number 1234 is the number of the fax tool in the Welcome Centre. The call is automatically answered by the ring detect circuit 200 to allow the tool to receive the telephone number of the remote fax 5678.

These digits are decoded by the dual-tone multi-frequency signaling (DTMF) decoder in item 200 and relayed to the sending part of the tool 204, which dials the remote fax via a second line. Both the ring detect circuit 200 and the dialing circuit 204 include a DC loop, an AC transmission block, and an isolation barrier to make and receive transmissions over the AC transmission path. The AC transmission path couples the two lines so that the call can progress and be recorded by the controlling PC 202 in real time.

As a further feature, embodiments herein can enable the call to be spoofed and modified to check proposed fixes by the remote fax specialist. Thus, as shown in FIG. 2, the PC may be controlled remotely by the fax specialist. In addition, an analog fax signal is supplied to the controlling PC 202 to allow the monitoring of the facsimile transmission.

Once the call has been established, the network T.30 non standard facilities/non standard setup (NSF/NSS) or the transmit subscriber identification/called subscriber identification (TSI/CSI) facsimile information fields (FIFs) are used to establish call authenticity. If the call is from/to a fax in the support service domain it is allowed to proceed to call completion. The call is automatically recorded, tagged with a job number, date time stamped, and the resulting .wav file sent by e-mail to the remote fax specialists for problem diagnosis and resolution. E-mails may also be automatically sent to the customer providing conformation that the call has been recorded, logged and dispatched.

On receiving the way file, the fax specialist can use any common automated fax problem resolution tools such as Telegra (available from Telegra Inc., Eastport, N.Y., USA); a digital sampling channel probe (DSCP), and DataProbe (available from QualityLogic, Moorpark Calif., USA) to analyze the call, understand the problem and make recommendations on how to fix the problem.

Figure 3:
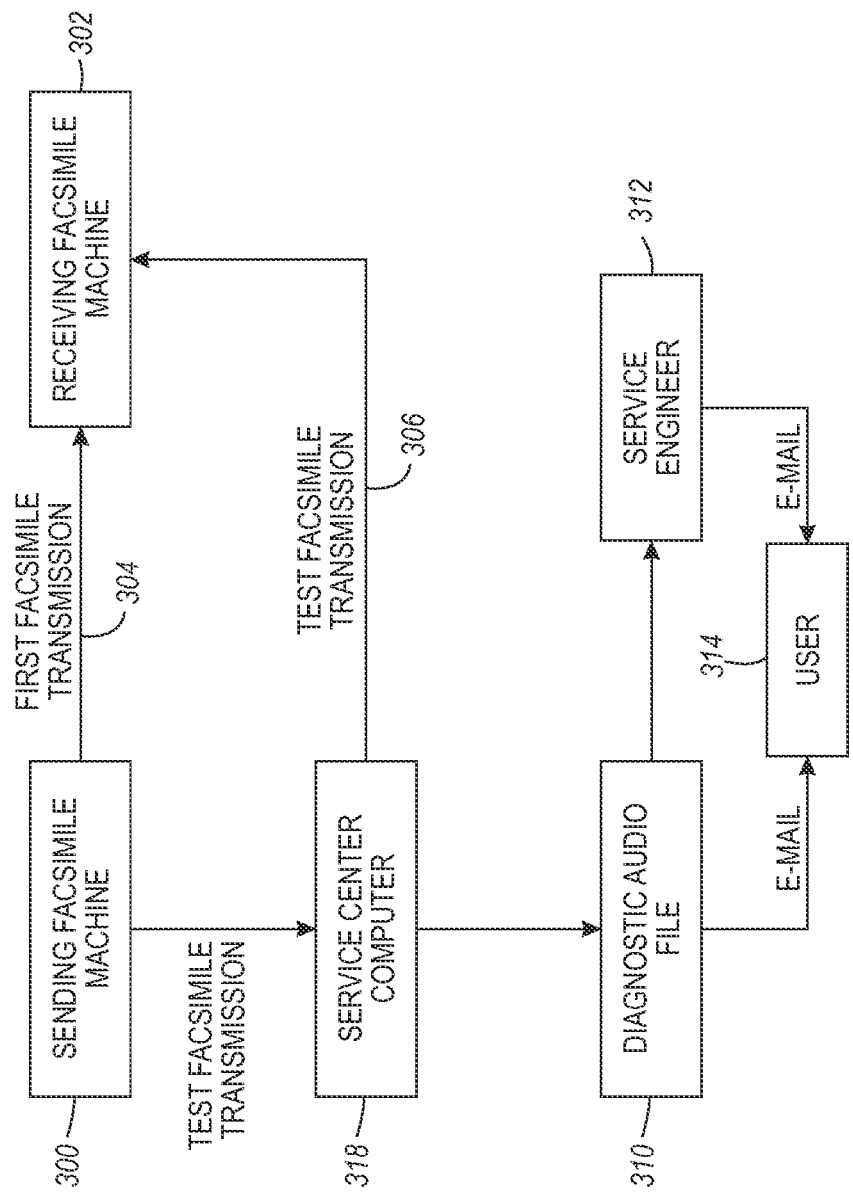
FIG. 3 is a system diagram illustrating various embodiments herein.

FIG. 3 illustrates an exemplary system embodiment herein. Such a system can include a first facsimile machine (which again can be the sending facsimile machine 300 or the receiving facsimile machine 302) that detects a first facsimile transmission error. The facsimile transmission error again occurs during a first facsimile transmission 304 sent from the sending facsimile machine 300 to the receiving facsimile machine 302.

Further, the system includes a service center computer 308 that is operatively connected to the first facsimile machine. Upon detection of the first facsimile transmission error, a graphic user interface of the first facsimile machine can provide an option to perform a diagnostic routine on the first facsimile transmission 304.

Additionally, upon selection of the option to perform the diagnostic routine, the first facsimile machine 300 automatically contacts the service center computer 308. If the first facsimile machine is the receiver, and the sender does not have the features described herein, the sender calls the service center with a manual call. Then, the service center computer 308 forms a connection between the sending facsimile machine 300 and the receiving facsimile machine 302. This connection can comprise a simple telephone call and passes through the service center computer 308 to allow the service center computer 308 to monitor and record the telephone call communications between the sending facsimile machine 300 and receiving facsimile machine 302.

The facsimile machine 300 then transmits a test facsimile transmission to the receiving facsimile machine 302 through the service center computer 308. The test facsimile transmission can be a generic test item or can contain part of (or all of) the first facsimile transmission 304. The service center computer 308 automatically records sounds sent by the sending facsimile machine 300 and the receiving facsimile machine 302 during the test facsimile transmission to produce an audio diagnostic file 310. The service center computer 308 tags the audio diagnostic file 310 with a job number, and date and time stamps the audio diagnostic file.

Then, the service center computer 308 automatically forwards the audio diagnostic file to a service engineer 312 for diagnosis. The service center computer 308 can also send an e-mail to the user 314 associated with the sending facsimile machine 300. The e-mail identifies the diagnostic routine and contains the audio diagnostic file. The service engineer 312 sends an e-mail with a problem solution suggestion to the user 314 associated either with the sending facsimile machine 300 or the receiving facsimile machine 302 based on the diagnosis of the audio diagnostic file.

Figure 4:
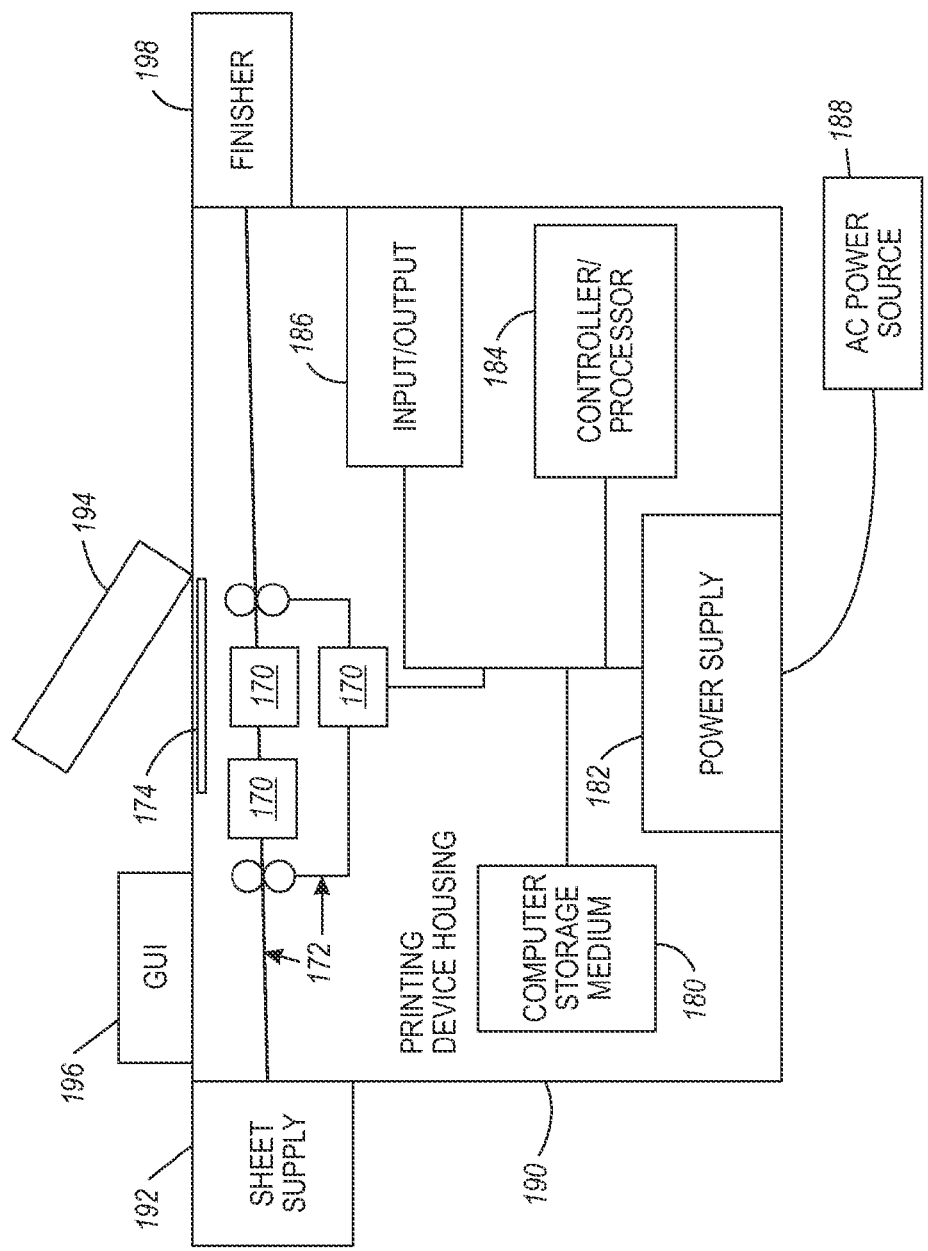
FIG. 4 is a side-view schematic diagram of a device according to embodiments herein.

Additional exemplary embodiments herein include a facsimile machine embodiment, such as a multi-function printing device that includes a fax feature. As shown in FIG. 4, this particular multi-function printer machine 190 has a media path 172 that moves sheets of media by a marking device 170 (shown in FIG. 4). The printing device 190 can comprise, for example, a printer, copier, multi-function machine, etc.

The printing device 190 can include any form of scanning device, such as one used within a document handler 194 of a printing device 190. The printer body housing 190 has one or more functional components that operate on power supplied from the alternating current (AC) 188 by the power supply 182. The power supply 182 converts the external power 188 into the type of power needed by the various components.

The printing device 190 includes a controller/processor 184, at least one marking device (printing engine) 170 operatively connected to the processor 184, a media path 172 positioned to supply sheets of media from a paper tray 192 to the marking device(s) 170 and a communications port (input/output) 186 operatively connected to the processor 184 and to a computerized network external to the printing device. After receiving various markings from the printing engine(s), the sheets of media pass to a finisher 198 which can fold, staple, sort, etc., the various printed sheets.

Further, the printing device 190 includes at least one accessory functional component, such as the sheet supply/paper tray 192, finisher 198, graphic user interface assembly 196, etc., that also operate on the power supplied from the external power source 188 (through the power supply 182).

The processor 184 controls the various actions of the printing device. A computer storage medium device 180 (which can be optical, magnetic, capacitor based, etc.) is readable by the processor 184 and stores the scanned images and instructions that the processor 184 executes to allow the multi-function printing device to perform its various functions, such as those described herein.

FIG. 4 also illustrates a main platen 174 adjacent to a document handler 194. With this exemplary printing device, items can be placed directly on the main platen 174, or a stack of sheets may be placed within the document handler 194. When the document handler 194 is closed over the main platen 174, the document handler 194 passes in the sheets over the main platen 174.

The scanner 194 thus scans an image of an item. The processor 184 is operatively connected to the scanner 194 and processes the image of the item. Also, the input/output communications port 186 can send the image of the item to other devices external to the facsimile machine as facsimile transmissions. Further, the graphic user interface 196 can be operatively connected to the processor 184 and allows a user to provide input and receive notifications.

The processor 184 detects a first facsimile transmission error. Again, the first facsimile transmission error occurs during a first facsimile transmission sent from the input/output 186 communications port to a receiving facsimile machine. Upon the detection of the first facsimile transmission error, the graphic user interface 196 provides an option to perform a diagnostic routine on the first facsimile transmission. The graphic user interface 196 can also or alternatively provide an audible alarm upon detecting the facsimile transmission error. The graphic user interface 196 can further provide an input field for a number of the service center computer. Additionally, the graphic user interface 196 can provides an input question for a user to allow recordation of the first facsimile transmission to the receiving facsimile machine.

Following this, upon selection of the option to perform the diagnostic routine, the input/output communications port 186 automatically contacts the service center computer 308 for diagnostic analysis. Then, the service center computer 308 connects the input/output communications port 186 to the receiving facsimile machine 302 through the service center computer 308.

Next, the input/output communications port 186 sends as a test facsimile transmission 306 to the receiving facsimile machine 302 through the service center computer 308. The service center computer 308 automatically records sounds sent by the sending facsimile machine 190/300 and the receiving facsimile machine 302 during the test facsimile transmission to produce an audio diagnostic file. Additionally, the service center computer 308 automatically forwards the audio diagnostic file to a service engineer for diagnosis 312.

Thus, the embodiments herein allow a "problem" communication between a sending and a particular receiving fax to be analyzed in a timely fashion and potential non-volatile memory (NVM) changes to be applied to the non-volatile memory of the facsimile machine via, for example, remote NVM screwdriver techniques. Alternately, recommended steps can be displayed on the facsimile machine's user interface, or can be communicated directly to the customer via the Welcome Centre. It is feasible that such NVM changes are only applied by the facsimile machine when sending to a particular remote fax "problem" location.

The embodiments herein enable the customer to directly send a very detailed way file, containing real-time information, of the fax problem directly to the fax specialist without any service calls or disruption to normal workflows. The way file can then be analyzed directly by a fax specialist to give the local engineer support in applying timely fixes. The embodiments herein also enable the fax design teams to capture "real-world" knowledge and produce robust fax products.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements).

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, position, size, shape, angle, color, or material.

What is claimed is:
1. A method comprising:
    detecting a first facsimile transmission error using one of a sending facsimile machine and a receiving facsimile machine, said facsimile transmission error occurring during a first facsimile transmission sent from said sending facsimile machine to said receiving facsimile machine;
    automatically contacting, by one of said sending facsimile machine and said receiving facsimile machine, a service center computer upon said detecting of said first facsimile transmission error;

automatically connecting, through said service center computer, said sending facsimile machine and said receiving facsimile machine;

automatically sending a test facsimile transmission from said sending facsimile machine to said receiving facsimile machine through said service center computer;

automatically recording sounds produced by said sending facsimile machine and said receiving facsimile machine using said service center computer during said test facsimile transmission to produce an audio diagnostic file; and automatically forwarding said audio diagnostic file to a service engineer for diagnosis, using said service center computer.

2. The method according to claim 1, further comprising performing automated analysis on said audio diagnostic file.

3. The method according to claim 1, further comprising tagging said audio diagnostic file with a job number, and date and time stamping said audio diagnostic file using said service center computer.

4. The method according to claim 1, further comprising sending an e-mail to a user associated with one of said sending facsimile machine and said receiving facsimile machine from said service center computer, said e-mail identifying a diagnostic routine.

5. The method according to claim 1, further comprising sending an e-mail with a problem solution suggestion to a user associated with one of said sending facsimile machine and said receiving facsimile machine from said service engineer based on said diagnosis of said audio diagnostic file.

6. A method comprising:
detecting a first facsimile transmission error using one of a sending facsimile machine and a receiving facsimile machine, said facsimile transmission error occurring during a first facsimile transmission sent from said sending facsimile machine to said receiving facsimile machine;

automatically providing an option to perform a diagnostic routine on said first facsimile transmission through a graphic user interface of one of said sending facsimile machine and said receiving facsimile machine upon said detecting of said first facsimile transmission error;

automatically contacting, by one of said sending facsimile machine and said receiving facsimile machine, a service center computer upon selection of said option to perform said diagnostic routine;

automatically connecting, through said service center computer, said sending facsimile machine and said receiving facsimile machine;

automatically sending a test facsimile transmission from said sending facsimile machine to said receiving facsimile machine through said service center computer;

automatically recording sounds produced by said sending facsimile machine and said receiving facsimile machine using said service center computer during said test facsimile transmission to produce an audio diagnostic file; and automatically forwarding said audio diagnostic file to a service engineer for diagnosis, using said service center computer.

7. The method according to claim 6, further comprising performing automated analysis on said audio diagnostic file.

8. The method according to claim 6, further comprising tagging said audio diagnostic file with a job number, and date and time stamping said audio diagnostic file using said service center computer.

9. The method according to claim 6, further comprising sending an e-mail to a user associated with one of said sending facsimile machine and said receiving facsimile machine from said service center computer, said e-mail identifying said diagnostic routine.

10. The method according to claim 6, further comprising sending an e-mail with a problem solution suggestion to a user associated with one of said sending facsimile machine and said receiving facsimile machine from said service engineer based on said diagnosis of said audio diagnostic file.

11. A system comprising:
a sending facsimile machine and a facsimile machine, one of said sending facsimile machine and said receiving facsimile machine detecting a first facsimile transmission error, said facsimile transmission error occurring during a first facsimile transmission sent from said sending facsimile machine to said receiving facsimile machine; and a service center computer operatively connected to one of said sending facsimile machine and said receiving facsimile machine, upon detecting of said first facsimile transmission error, a graphic user interface of one of said sending facsimile machine and said receiving facsimile machine provides an option to perform a diagnostic routine on said first facsimile transmission, upon selection of said option to perform said diagnostic routine, one of said sending facsimile machine and said receiving facsimile machine automatically contacts said service center computer, said service center computer automatically connects said sending facsimile machine to said receiving facsimile machine through said service center computer, said sending facsimile machine automatically sends a test facsimile transmission to said receiving facsimile machine through said service center computer, said service center computer automatically records sounds produced by said sending facsimile machine and said receiving facsimile machine during said test facsimile transmission to produce an audio diagnostic file, and said service center computer automatically forwards said audio diagnostic file to a service engineer for diagnosis.

12. The system according to claim 11, further comprising a service engineer computer performing automated analysis on said audio diagnostic file.

13. The system according to claim 11, said service center computer tags said audio diagnostic file with a job number, and date and time stamps said audio diagnostic file.

14. The system according to claim 11, said service center computer sends an e-mail to a user associated with one of said sending facsimile machine and said receiving facsimile machine, said e-mail identifying said diagnostic routine.

15. The system according to claim 11, said service engineer sending an e-mail with a problem solution suggestion to a user associated with one of said sending facsimile machine and said receiving facsimile machine based on said diagnosis of said audio diagnostic file.

16. A facsimile machine comprising:
a scanner that scans an image of an item;
a processor operatively connected to said scanner that processes said image of said item;
an input/output communications port operatively connected to said processor that sends said image of said item to other devices external to said facsimile machine as facsimile transmissions; and a graphic user interface operatively connected to said processor that allows a user to provide input and receive notifications, said processor detects a first facsimile transmission error, said first facsimile transmission error occurring during a first facsimile transmission sent from said input/output communications port to a receiving facsimile machine, upon said detecting of said first facsimile transmission error, said graphic user interface provides an option to perform a diagnostic routine on said first facsimile transmission, and upon selection of said option to perform said diagnostic routine, said input/output communications port automatically contacts a service center computer for diagnostic analysis of said facsimile transmission, said input/output communications port connects to said receiving facsimile machine through said service center computer, and said input/output communication port automatically sends a test facsimile transmission to said receiving facsimile machine through said service center computer allowing said service center computer to automatically record sounds produced by said input/output communication port and said receiving facsimile machine during said test facsimile transmission to produce an audio diagnostic file available to a service engineer for diagnosis.

17. The facsimile machine according to claim 16, said graphic user interface further provides an input field for a number of said service center computer.

18. The facsimile machine according to claim 16, said graphic user interface further provides an input question for a user to allow recordation of said first facsimile transmission to said receiving facsimile machine.

19. The facsimile machine according to claim 16, said test facsimile transmission comprising a test page.

\* \* \* \* \*